Oct. 9, 1934.   E. L. JUNGHANNS   1,975,950
CABLE MACHINE CAPSTAN
Filed March 29, 1934   3 Sheets-Sheet 2
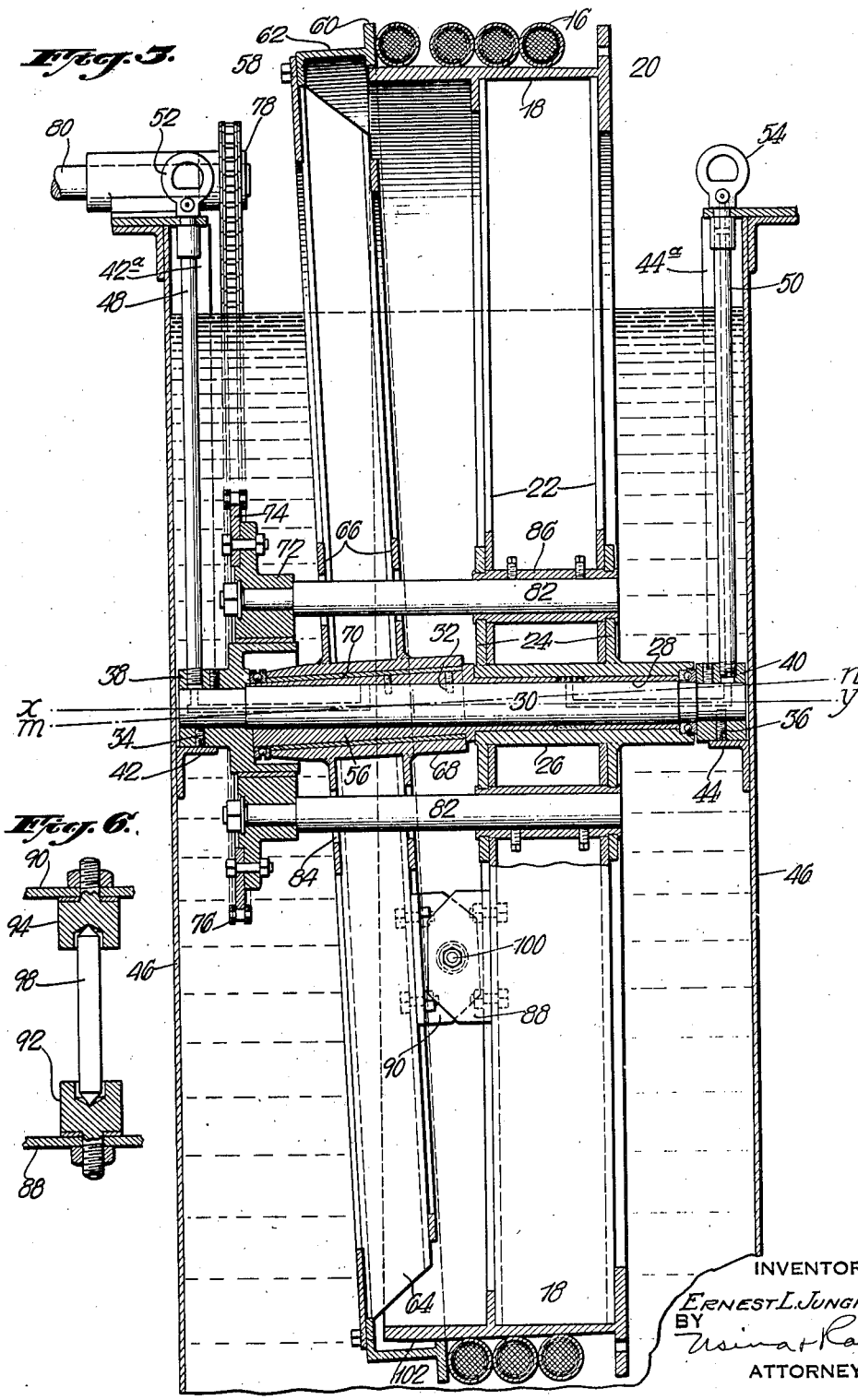
INVENTOR
ERNEST L. JUNGHANNS.
BY
ATTORNEYS Oct. 9, 1934.   E. L. JUNGHANNS   1,975,950
CABLE MACHINE CAPSTAN
Filed March 29, 1934   3 Sheets-Sheet 3
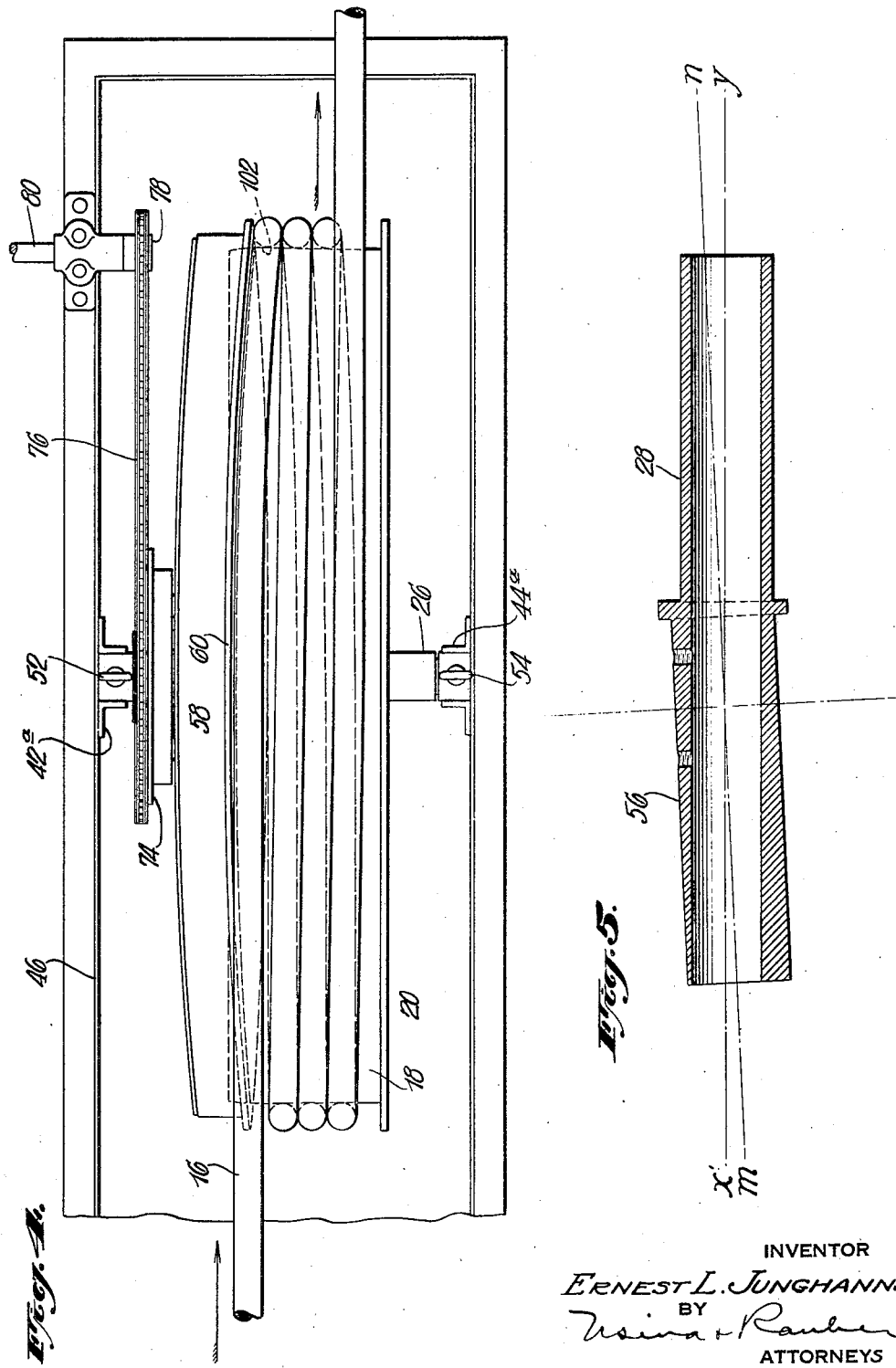
INVENTOR
ERNEST L. JUNGHANNS.
BY
ATTORNEYS Patented Oct. 9, 1934

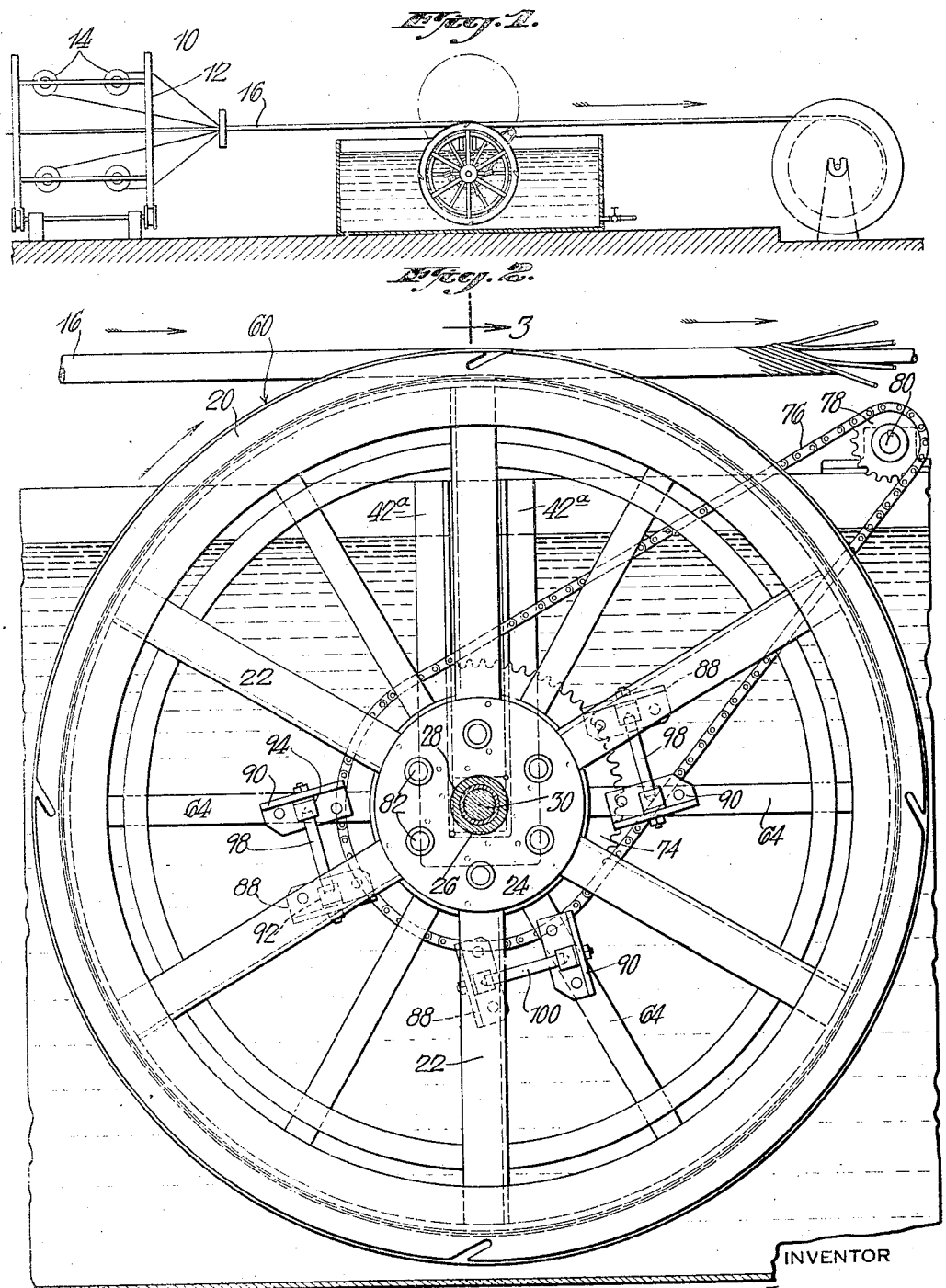

1,975,950

UNITED STATES PATENT OFFICE 1,975,950

CABLE MACHINE CAPSTAN

Ernest L. Junghanns, Yonkers, N. Y., assignor to Anaconda Wire & Cable Company, New York, N. Y., a corporation of Delaware Application March 29, 1934, Serial No. 717,912

6 Claims. (Cl. 254—176)

This invention relates to an improved type of capstan used for drawing off the cable from a cabling machine, cable wrapping machine, or the like. It is customary to provide a rotating member commonly known as a capstan for pulling the cable from a cable stranding or a cable wrapping machine. In such machines, it is necessary to provide means for shifting the cable laterally on the capstan so as to keep a clear space for the oncoming end of the cable. Heretofore, it has been the practice to provide a stationary plate forming a sort of circular wedge against which the side of the cable crowds as the capstan turns. The use of such a fixed plate is highly objectionable as it has a tendency to injure the side of the cable or the side of the insulated paper wrapping which frequently surrounds the cable.

Stationary deflecting plates are almost prohibitive when used in connection with capstans for pulling weather-proof cable or wire from a cabling machine because such stationary plates damage the finish of the wire or cable by shaving off part of the insulation or injuring the surface of the cable.

To overcome the shortcomings of prior practice, I have devised an improved so-called fleeting ring, or deflector which rotates in synchronism with the capstan but about an axis which is inclined to the axis of rotation of the capstan. In this way, the rotary motion of the capstan and deflecting member gradually moves the convolutions laterally on the capstan eliminating the objectionable action of the cable rotating past a stationary or fixed member. My improved capstan includes various other features of novelty and advantage, all of which will be clear from the accompanying drawings when read in connection with the detailed description. The points of novelty will be defined with particularity in the appended claims.

In the drawings—

Fig. 1 is a sectional elevation showing my improved capstan working in combination with a cable making or cable wrapping machine; Fig. 2 is an enlarged detail view of the capstan, the deflecting member and related parts; Fig. 3 is a transverse vertical section on line 3—3 of Fig. 2; Fig. 4 is a plan view of Fig. 2; Fig. 5 is a detail view in longitudinal section through a duplex trunnion member rotatably supported in the capstan and deflecting member; Fig. 6 is a fragmentary detail illustrative of a compensating driving connection between the capstan and the deflecting member.

Referring in detail to the drawings, 10 represents conventionally a cabling machine or cable wrapping machine including essentially a rotary flier 12 carrying a plurality of reels 14 which may be regarded either as supply reels for cable strands or as reels of paper or similar tape-like insulation to be wrapped about a cable. The cable is assumed to be moving from the machine 10 in the direction of the arrow in Figs. 1 and 2 and one or more convolutions are wrapped around the rim 18 of the capstan indicated generally by numeral 20. The capstan includes a plurality of radial spokes 22 secured near their inner ends to outwardly extending flanges 24 of a hub 26 which is rotatably mounted on the substantially cylindrical capstan journal 28. This journal is carried by and secured to a fixed cross member 30, pins 32 being provided to prevent relative motion between the parts. The cross member is secured at its opposite ends by means of set screws 34 and 36 to bearing members 38 and 40. These members rest on angle brackets 42 and 44 secured to the side walls of a tank 46. Upright rods 48 and 50 having grapple rings 52 and 54 secured at their ends are threaded into the bearing members 38 and 40 and provide means whereby the entire assemblage may be lowered into or lifted from the tank 46. The upright members 48 and 50 are provided with suitable channels for the introduction of a lubricant and similar channels are also provided in the cross member 30 to facilitate lubrication of the journals.

The longitudinal axis of the cross member 30 coincides with the axis of the journal 28. This axis is represented in the drawings as the axis X—Y and corresponds to the axis of rotation of the capstan. Inclined at an acute angle to and intersecting the axis X—Y, there is another trunnion indicated at 56. This forms a rotatable bearing for the fleeting ring or deflecting member indicated as a whole at 58. The axis of rotation of this member is indicated in the drawings at M—N. The fleeting ring or deflecting member includes a ring-like portion 60 which encircles the rim of the capstan. This ring is connected by an annular flanged body 62 with spokes 64 secured to flanged extensions 66 of a hub 68 which is bored to fit a sleeve 70 secured to inclined trunnion 56.

The bearing 38 rotatably supports the hub portion 72 of a sprocket 74 which is adapted to be driven by a chain 76 from a drive sprocket 78 secured to a drive shaft 80. A plurality of driving pins 82 bolted to the sprocket hub 72 pass freely through clearance openings 84 formed in the hub of the deflecting member and are rigidly secured to bushings 86 carried by the hub flanges 24 of the capstan. Thus rotary motion from the drive sprocket 78 is transmitted to a capstan.

Due to the fact that the capstan and the fleeting ring or deflecting member rotate about axes which are inclined to one another, a special compensating driving connection between the capstan and the deflecting member is provided. This compensating connection, as shown in the drawings, includes brackets 88 and 90 secured respectively to the capstan spokes and the deflecting member spokes. These brackets carry socketed members 92 and 94, as shown in detail in Fig. 6. Engaged with the sockets of these members, there are connecting pins 98. As thus arranged, rotary movement of the capstan will be transmitted by the connecting pin 98. This connection is such that the pin can swivel with respect to the socketed members 92 and 94, so as to compensate for the relative angular movement between the deflecting member and the capstan. In the embodiment illustrated, the parts rotate to move the cable in the direction of the arrows in Fig. 2, the pins 98 transmit rotary movement from the capstan to the deflecting member. A similar pin 100 is provided between similar connections to take-up the backlash. This pin 100 could be utilized as a driver, assuming that the direction of rotation is to be reversed.

A portion of the rim 18 of the capstan, indicated at the left side of Fig. 3, is shaped to correspond to the surface of a sphere, the center of which lies at the intersection of the axis X—Y and M—N of journals for the capstan and deflecting member, respectively. This spherical portion is indicated at 102. The part of the rim 18 to the right of the spherical portion is slightly tapered so as to facilitate the deflection of the cable during the rotary movement of the deflecting member.

In the operation of the device described, the underside of the cable 16, coming from the cabling or wrapping machine 10, engages the spherical surface 102 on a line tangent thereto and the side of the oncoming end of the cable strikes the side or upright wall of the deflecting member on a tangent. As the capstan and the deflecting member rotate in the direction to move the cable, as indicated by the arrows in Fig. 2, the deflecting member, while rotating, will gradually move the convolution or convolutions wrapped about the capstan laterally and during this lateral movement it will be apparent that the deflecting member travels at substantially the same peripheral speed as that of the cable, hence there will be no objectionable friction exerted such as is the case when the deflecting is accomplished by a stationary deflecting member as heretofore.

Moreover, due to the arrangement wherein the deflecting member rotates on an axis intersecting and inclined to the axis of rotation of the capstan substantially or approximately one hundred and eighty degrees of the deflecting ring is in contact with the part of the convolution being deflected. This distributes the deflecting load over such a great length of cable that no harmful pressure is exerted on any given point. And the spherical crowning of a portion of the capstan on a radius struck from the line of intersection of the axes of rotation of the capstan and the deflecting ring provides an arrangement wherein a very small clearance opening in the ring is required.

The entire assemblage can be moved or lowered into the tank 46 the brackets 42 and 44 having upright portions 42a and 44a to facilitate such insertion or removal of the assemblage. This tank may be partially filled with oil, or liquid insulation for the treatment of the wrappings about the cable, if desired.

While I have described quite precisely the specific embodiment of the invention illustrated, it is to be understood that various modifications may be made. For example, instead of the swivel pin connections operatively connecting the deflecting member and the capstan, I may employ universal joints and instead of forming the trunnions 28 and 56 of the same piece they may be separately formed and secured to the cross member 30 or in fact may be integrally formed with the cross member. Various other mechanical substitutions may be made without departing from the invention as defined in the appended claims.

What I claim is:—

1. A device of the character described comprising a capstan, bearings on opposite sides thereof, a fixed cross member secured to the bearings, two trunnions whose axes are inclined to each other secured to said cross member, one of said trunnions rotatably supporting said capstan, a cable deflecting member rotatably supported on the other trunnion and means for rotating the capstan and the deflecting member in synchronism.

2. A device of the character described comprising a capstan whose rim has a partly spherical portion, a cable deflecting member encircling said spherical portion, respective trunnions rotatably supporting said capstan and said deflecting member, the axes of said trunnions intersecting at a point corresponding to the center of the spherical portion of the deflecting member.

3. A device of the character described comprising a capstan, bearings on opposite sides thereof, a fixed cross member secured to the bearings, two trunnions whose axes are inclined to each other secured to said cross member, one of said trunnions rotatably supporting said capstan, a cable deflecting member rotatably supported on the other trunnion, power transmission means operably connecting the capstan and the deflecting member, and means secured to said bearings for lifting and lowering the asemblage as a unit.

4. A device of the character described comprising a capstan, bearings on opposite sides thereof, a fixed cross member secured to the bearings, two trunnions whose axes are inclined to each other secured to said cross member, one of said trunnions rotatably supporting said capstan, a cable deflecting member rotatably supported on the other trunnion, a sprocket journalled on one of said bearings and having a driving connection with said capstan and swivelled driving connections compensating for the angular relative movement between the capstan and the deflecting member.

5. The combination with a cable making machine of a rotatable capstan adapted to have a plurality of convolutions of cable from said machine wrapped therearound, a rotatable deflecting member whose side face at one point is tangent to that part of the cable coming from the machine to the capstan, respective trunnions whose axes intersect at an acute angle to one anothed for supporting said capstan and said deflecting member and means for driving the capstan and deflecting member.

6. A device of the character described comprising a capstan, bearings on opposite sides thereof, a pair of trunnions sustained by said bearings and whose axes are inclined to each other, one of said trunnions rotatably supporting said capstan, a cable deflecting member rotatably supported on the other trunnion and means for rotating the capstan and the deflecting member in synchronism.

ERNEST L. JUNGHANNS.